United States Patent
Chen et al.

(10) Patent No.: US 7,443,476 B2
(45) Date of Patent: Oct. 28, 2008

(54) CONTINUOUS DOMAIN VERTICAL ALIGNMENT LIQUID CRYSTAL DISPLAY

(75) Inventors: Chueh-Ju Chen, Miao-Li (TW);
Jia-Pang Pang, Miao-Li (TW);
Chiu-Lien Yang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 341 days.

(21) Appl. No.: 10/962,291

(22) Filed: Oct. 8, 2004

(65) Prior Publication Data
US 2005/0078251 A1  Apr. 14, 2005

(30) Foreign Application Priority Data
Oct. 9, 2003   (TW) ............................. 92128082 A

(51) Int. Cl.
*G02F 1/1339* (2006.01)
(52) U.S. Cl. ..................... 349/130; 349/129; 349/156
(58) Field of Classification Search ......... 349/155–156, 349/129–130
See application file for complete search history.

(56) References Cited

U.S. PATENT DOCUMENTS

| | | | | |
|---|---|---|---|---|
| 6,335,775 B1 * | 1/2002 | Iwamura et al. | ............. | 349/125 |
| 6,525,797 B2 * | 2/2003 | Tsuda et al. | ................. | 349/139 |
| 6,573,964 B1 * | 6/2003 | Takizawa et al. | ............. | 349/129 |
| 6,600,539 B2 * | 7/2003 | Song | ........................... | 349/130 |
| 6,710,833 B2 | 3/2004 | Wang | | |
| 6,760,087 B2 | 7/2004 | Wu et al. | | |
| 7,136,140 B1 * | 11/2006 | Inoue et al. | ................. | 349/191 |
| 7,139,055 B2 * | 11/2006 | Ogishima et al. | ........... | 349/129 |
| 7,167,224 B1 * | 1/2007 | Takeda et al. | ............... | 349/139 |
| 7,268,848 B2 * | 9/2007 | Chen et al. | ................... | 349/141 |

\* cited by examiner

*Primary Examiner*—Andrew Schechter
*Assistant Examiner*—Hoan C Nguyen
(74) *Attorney, Agent, or Firm*—Wei Te Chung

(57) ABSTRACT

A continuous domain vertical alignment liquid crystal display (2) has a first substrate (21), a second substrate (22), and liquid crystal molecules (26) interposed between the substrates. A plurality of curved first protrusions (211) and a plurality of curved second protrusions (221) are disposed at insides of the substrates respectively. When an electric field is applied between the substrates, the liquid crystal molecules tend to be oriented parallel to the substrates. In addition, the curved protrusions affect the orientations of the liquid crystal molecules, such that the liquid crystal molecules are directed to incline in various directions in smooth continuums. The visual effect of the continuous domain vertical alignment liquid crystal display is the sum of multiple smooth continuous domains. Thus the continuous domain vertical alignment liquid crystal display provides a more even display performance at various different viewing angles.

4 Claims, 7 Drawing Sheets

CONTINUOUS DOMAIN VERTICAL ALIGNMENT LIQUID CRYSTAL DISPLAY

BACKGROUND OF THE INVENTION

1. Field of the Invention

The invention relates to a vertical alignment liquid crystal display, and particularly to a vertical alignment liquid crystal display having continuous domains. This application relates to a contemporaneously filed application having the same applicant, the same assignee and the same title therewith.

2. Description of Prior Art

Since liquid crystal displays are thin and light, consume relatively little electrical power and do not cause flickering, they have helped spawn product markets such as for laptop personal computers. In recent years, there has also been great demand for liquid crystal displays to be used as computer monitors and even televisions, both of which are larger than the liquid crystal displays of laptop personal computers. Such large-sized liquid crystal displays in particular require that an even brightness and contrast ratio prevail over the entire display surface, regardless of the observation angle.

Because the conventional TN (twisted nematic) mode liquid crystal display cannot easily satisfy these demands, a variety of improved liquid crystal displays have recently been developed. They include IPS (in-plane switching) mode liquid crystal displays, optical compensation TN mode liquid crystal displays, and MVA (multi-domain vertical alignment) mode liquid crystal displays. In MVA mode liquid crystal displays, each pixel is divided into multiple domains. Liquid crystal molecules of the pixel are vertically aligned when no voltage is applied, and are inclined in different directions according the domains they are in when a voltage is applied. In other words, in each pixel, the effective direction of the electric field in one domain is different from the effective direction of the electric field in a neighboring domain. Typical MVA mode liquid crystal displays have four domains in a pixel, and use protrusions and/or slits to form the domains.

Chinese Pat. Application. No. 01,121,750, published on Jan. 23, 2002, discloses a four-domain MVA liquid crystal display. Referring to FIG. 6 and FIG. 7, the MVA liquid crystal display 1 comprises a first substrate 11, a second substrate 12, a plurality of liquid crystal molecules 16 disposed between the two substrates 11, 12, and protrusions 111, 121 each having a triangular cross-section respectively disposed on the first substrate 11 and the second substrate 12. Components such as first and second polarizers having orthogonal polarization directions, pixel electrodes, common electrodes, thin film transistors and alignment films are also provided in the MVA liquid crystal display 1; however these components are not shown in FIG. 6 or FIG. 7.

FIG. 6 shows the alignment directions of the liquid crystal molecules 16 when the MVA liquid crystal display 1 is in an off state; that is, when no voltage is applied. Most of the liquid crystal molecules 16 are vertically aligned perpendicular to the substrates 11, 12. Accordingly, light beams do not change their polarization states when passing through the liquid crystal molecules 16. Because the polarization directions of the polarizers are orthogonal to each other, light beams that maintain their original polarization states when output from the first polarizer are absorbed by the second polarizer. In other words, the MVA liquid crystal display 1 is in a dark state when no voltage is applied.

FIG. 7 shows the alignment directions of the liquid crystal molecules 16 when the MVA liquid crystal display 1 is in an on state; that is, when a voltage is applied. An electric field perpendicular to the substrates 11, 12 is generated. Because the liquid crystal molecules 16 have negative dielectric anisotropy, they tend to be oriented in directions perpendicular to the electric field. In addition, the protrusions 111, 121 affect the orientations of the liquid crystal molecules 16. For example, the liquid crystal molecules 16 at two opposite sides of the protrusion 111 are respectively oriented from top-right to bottom-left and from top-left to bottom-right. These inclinations change the polarization states of light beams passing through the liquid crystal molecules 16. Therefore a certain amount of light emits from the MVA liquid crystal display 1. In other words, the MVA liquid crystal display 1 is in a lit state when a voltage is applied.

FIG. 8 shows orientation directions of the liquid crystal molecules 16 in four domains A, B, C, D. The protrusions 111, 121 are arranged on the substrates 11, 12 along generally V-shaped paths. Liquid crystal molecules 16 at two opposite sides of the upper portions of the protrusions 111, 121 incline in C and D regions, while liquid crystal molecules 16 at two opposite sides of the lower portions of the protrusions 111, 121 incline in A and B regions. The orientation directions of the liquid crystal molecules 16 in a same inter-protrusion region are consistent. The orientation direction of the liquid crystal molecules 16 in each same inter-protrusion region is orthogonal to the orientation directions of the liquid crystal molecules 16 in all of the other inter-protrusion regions. Therefore, each pixel attains a visual effect that is an overall result of four domains. This gives the MVA liquid crystal display 1 a more even display performance at various different viewing angles.

However, the four-domain configuration can only compensate visual performance in four directions. The overall viewing angle characteristics of the MVA liquid crystal display 1 are still inherently limited, and the MVA liquid crystal display 1 cannot satisfactorily present a uniform display at all viewing angles.

It is desired to provide a vertical alignment mode liquid crystal display which overcomes the above-described problems.

SUMMARY OF THE INVENTION

An object of the present invention is to provide a vertical alignment liquid crystal display which has improved wide viewing angle characteristics.

A continuous domain vertical alignment liquid crystal display in one embodiment of the present invention comprises a first substrate and a second substrate, and liquid crystal molecules interposed therebetween. A plurality of curved first protrusions and a plurality of curved second protrusions are disposed at insides of the first substrate and the second substrate respectively.

When an electric field is applied between the first and second substrates, the liquid crystal molecules tend to be oriented parallel to the first and second substrates. In addition, the curved protrusions affect the orientations of the liquid crystal molecules, such that the liquid crystal molecules are directed to incline in various directions in smooth continuums. The visual effect of the continuous domain vertical alignment liquid crystal display is the sum of multiple smooth continuous domains. Thus the continuous domain vertical alignment liquid crystal display provides a more even display performance at various different viewing angles compared to the conventional MVA liquid crystal display.

Other objects, advantages, and novel features of the present invention will become more apparent from the following detailed description when taken in conjunction with the accompanying drawings, in which:

DETAILED DESCRIPTION OF THE INVENTION

Figure 1:
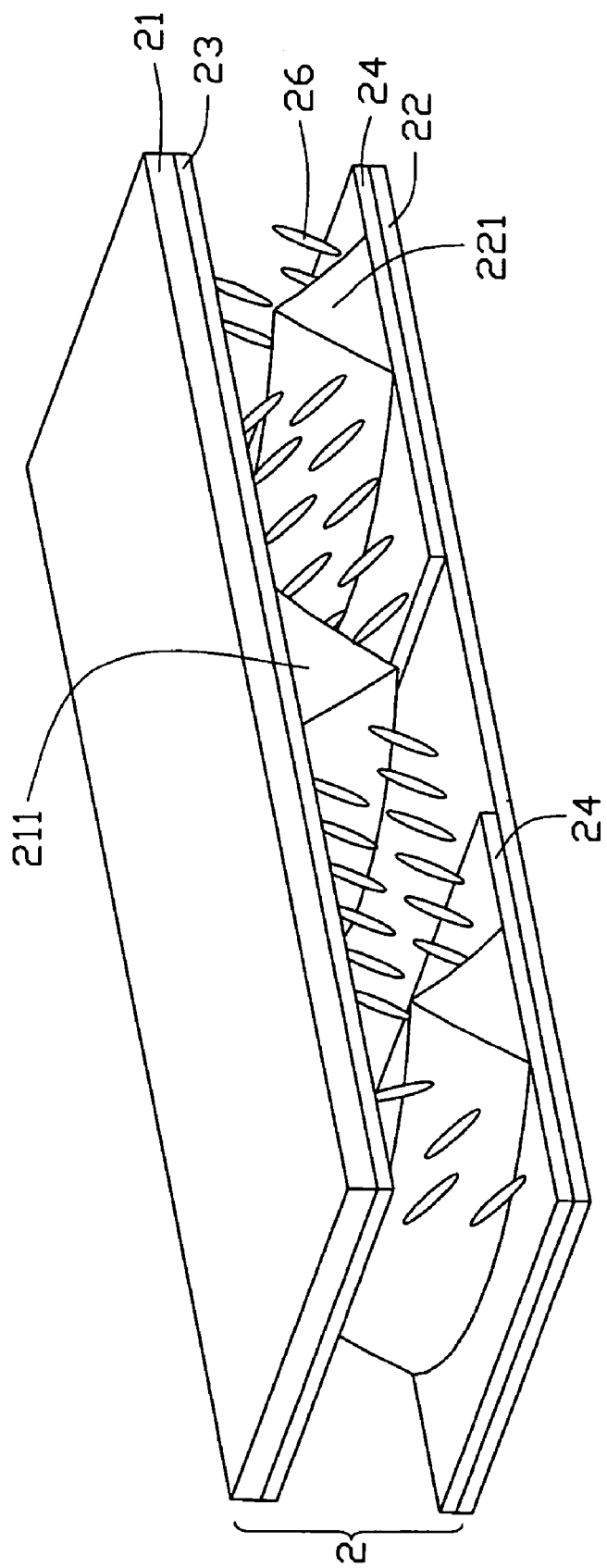
FIG. 1 is a schematic, isometric view of part of a continuous domain vertical alignment liquid crystal display (LCD) according to a first embodiment of the present invention, showing the LCD in an on state.
Figure 3:
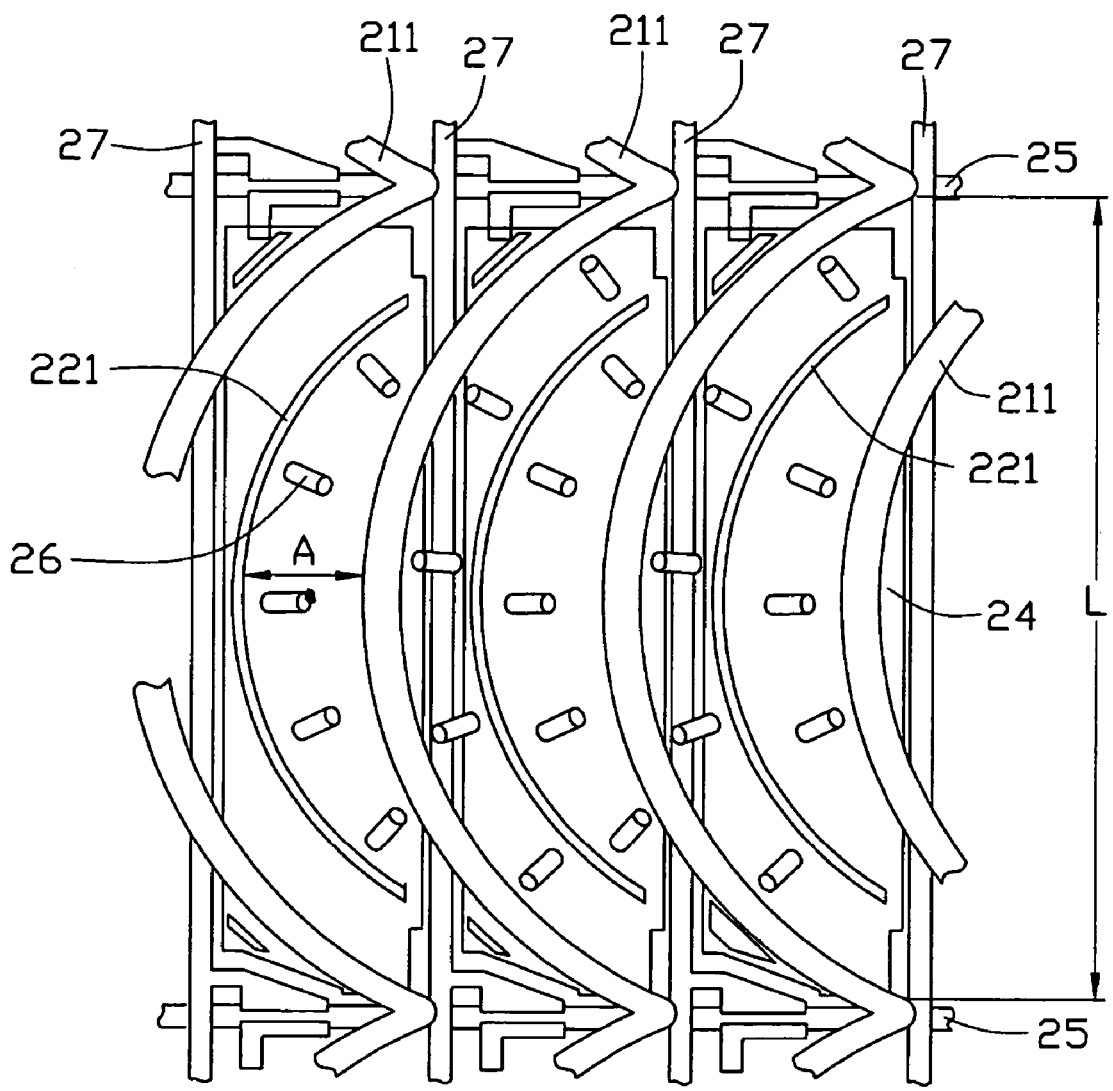
FIG. 3 is a schematic, top elevation of part of the LCD according to the first embodiment of the present invention in the on state, but not showing a first substrate thereof, and showing orientations of liquid crystal molecules thereof.

Referring to FIGS. 1 and 3, part of a continuous domain vertical alignment liquid crystal display (LCD) 2 according to the first embodiment of the present invention is shown. The LCD 2 comprises a first substrate 21, a second substrate 22, liquid crystal molecules 26 interposed between the first and second substrates 21, 22, and a plurality of gate lines 25 and data lines 27 formed on the second substrate 22. A common electrode 23 is formed on the first substrate 21, and a plurality of pixel electrodes 24 is formed on the second substrate 22. A plurality of the first protrusions 211 is formed on the common electrode 23, and a plurality of second protrusions 221 is formed on the pixel electrodes 24. Each of the first protrusions 211 and the second protrusions 221 has a curved shape In the illustrated embodiment, the first and second protrusions 211, 221 are arcuate. Further, each of the first protrusions 211 and the second protrusions 221 has a triangular cross-section. Typically, maximum widths of the first protrusions 211 are larger than maximum widths of the second protrusions 221. Preferably, the maximum widths of the first protrusions 211 are about 10 microns, and the maximum widths of the second protrusions 221 are about 7.5 microns.

When the LCD 2 is in an on state, a voltage is applied thereto, and the common electrode 23 and the pixel electrodes 24 generate an electric field perpendicular to the first substrate 21 and the second substrate 22. The liquid crystal molecules 26 have negative dielectric anisotropy, and are therefore inclined to be oriented parallel to the first substrate 21. In addition, the protrusions 211, 221 affect the orientations of the liquid crystal molecules 26, such that the liquid crystal molecules 26 form continuums of inclined alignments perpendicular to the slopes of the protrusions 211, 221. The visual effect of the LCD 2 is the sum of multiple smoothly continuous domains. Thus the LCD 2 provides a more even display performance at various different viewing angles compared to the conventional MVA liquid crystal display 1.

Figure 2:
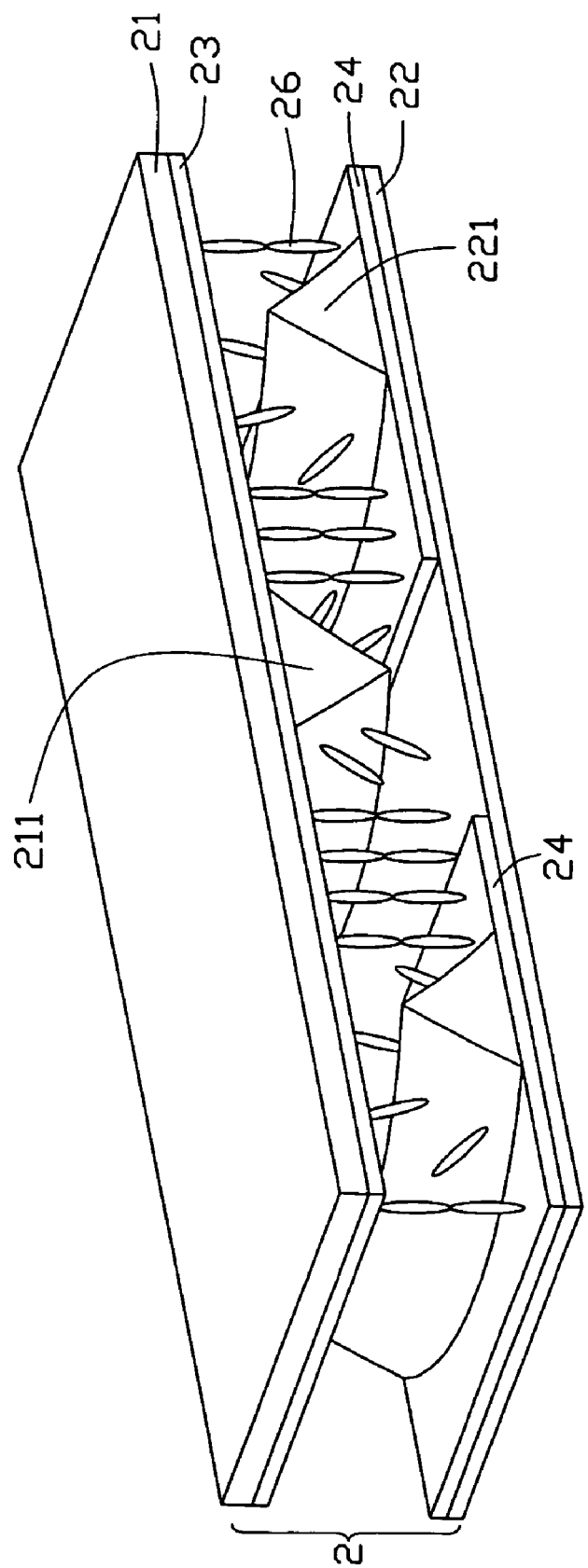
FIG. 2 is a similar to FIG. 1, but showing the LCD in an off state.

Referring to FIG. 2, the LCD 2 in an off state is shown. That is, when no voltage is applied, most of the liquid crystal molecules 26 between the first substrate 21 and the second substrate 22 are aligned in vertical directions. Therefore light beams passing between the first and second substrates 21, 22 do not change their polarization states.

Referring to FIG. 3, the orientation of the liquid crystal molecules 26 in the on state of the LCD 2 is shown. The gate lines 25 and data lines 27 formed on the second substrate 22 provide gate signals and data signals respectively. The protrusions 211, 221 cooperate with the electric field generated by the common electrode 23 and the pixel electrodes 24 to direct the liquid crystal molecules 26 to incline in various directions in smooth continuums.

According to the foregoing, a Cartesian coordinate system can be defined, with the X axis being parallel to the gate lines 25 and the Y axis being parallel to data lines 27. A path defining the shape of each protrusion 211, 221 satisfies the following equation:

$$x = A\sin(\pi^* y/L), (0 \leq y \leq L) \quad (1)$$

wherein x and y are Cartesian coordinates of any point along the path. 'A' is a constant number, which is the horizontal interval between each adjacent first protrusion 211 and second protrusion 221. 'L' is the length of the protrusion 211 or 221 along the Y axis.

Figure 4:
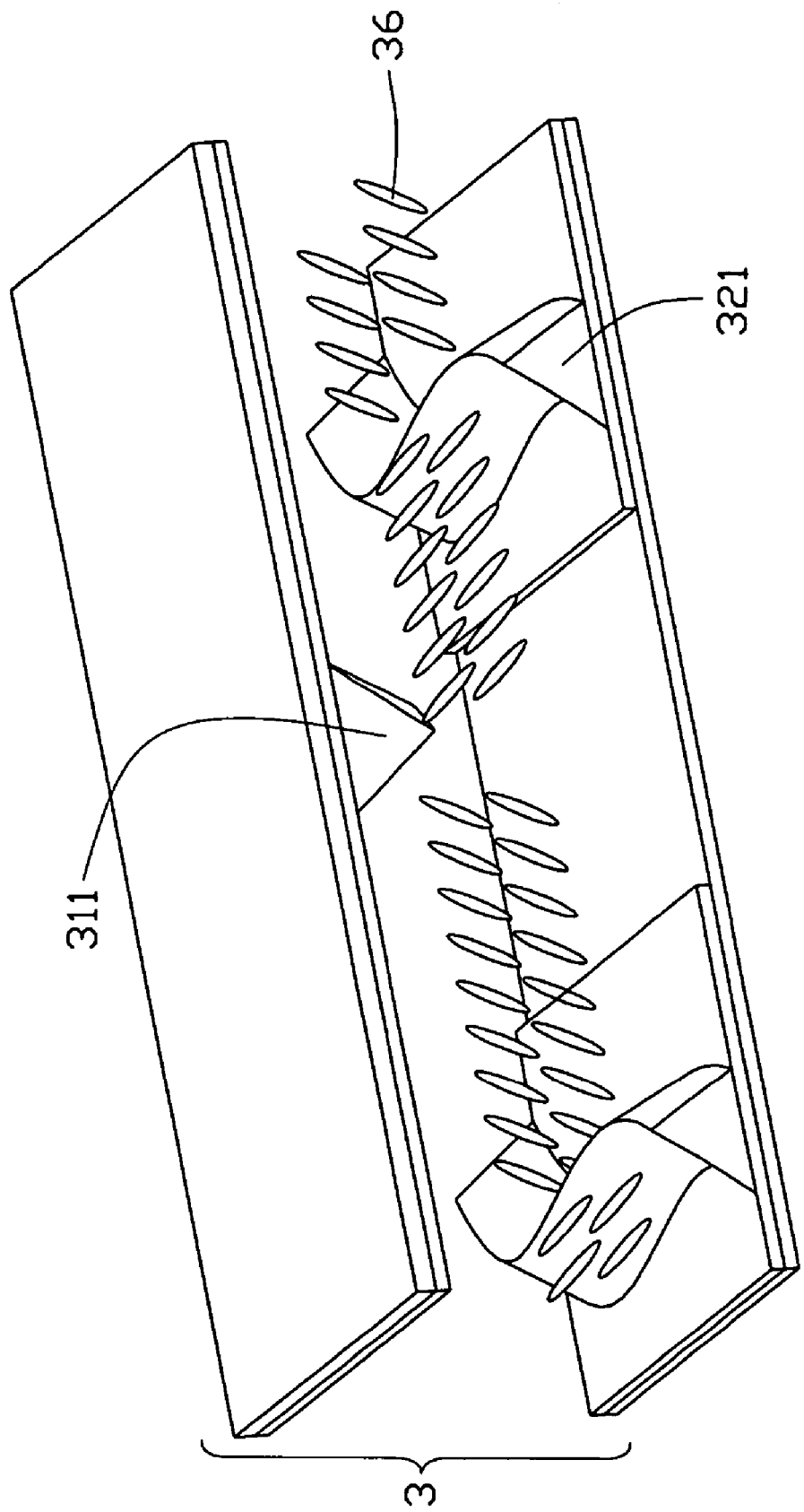
FIG. 4 is a schematic, exploded isometric view of part of a continuous domain vertical alignment liquid crystal display (LCD) according to a second embodiment of the present invention, showing the LCD in an on state.

FIG. 4 is a view of a continuous domain vertical alignment liquid crystal display (LCD) 3 according to the second embodiment of the present invention, showing the LCD 3 in an on state. In the illustrated embodiment, first and second protrusions 311, 321 are generally "S" shaped. A Cartesian coordinate system can be defined, in similar fashion to that described above in relation to the LCD 2. A path defining the wavy shape of each of the first and second protrusions 311, 321 satisfies the following equation:

$$x = A\sin(\pi^* y/2L), (0 \leq y \leq L) \quad (2)$$

wherein x and y are Cartesian coordinates of any point along the path. 'A' is a constant number, which is the horizontal interval between each adjacent first protrusion 311 and second protrusion 321. 'L' is the length of the protrusion 311 or 321 along the Y axis.

The wavy shapes of the protrusions 311, 321 affect the orientations of liquid crystal molecules 36, such that the liquid crystal molecules 36 are directed to incline in various directions in smooth continuums. The visual effect of the LCD 3 is the sum of multiple smooth continuous domains. Thus the LCD 3 provides a more even display performance at various different viewing angles compared to the conventional MVA liquid crystal display 1, and even compared to the LCD 2.

Figure 5:
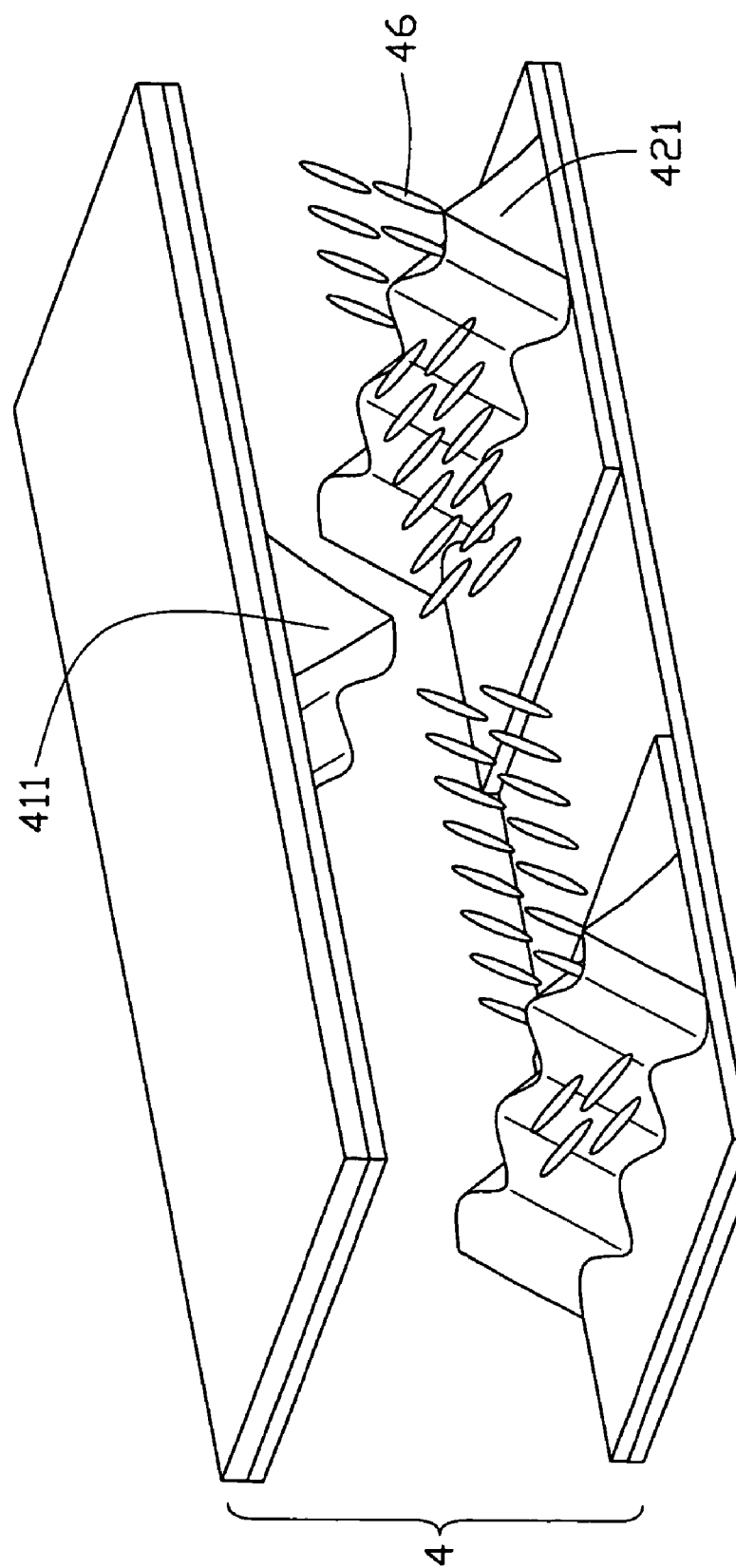
FIG. 5 is a schematic, exploded isometric view of part of a continuous domain vertical alignment liquid crystal display (LCD) according to a third embodiment of the present invention, showing the LCD in an on state.
Figure 6:
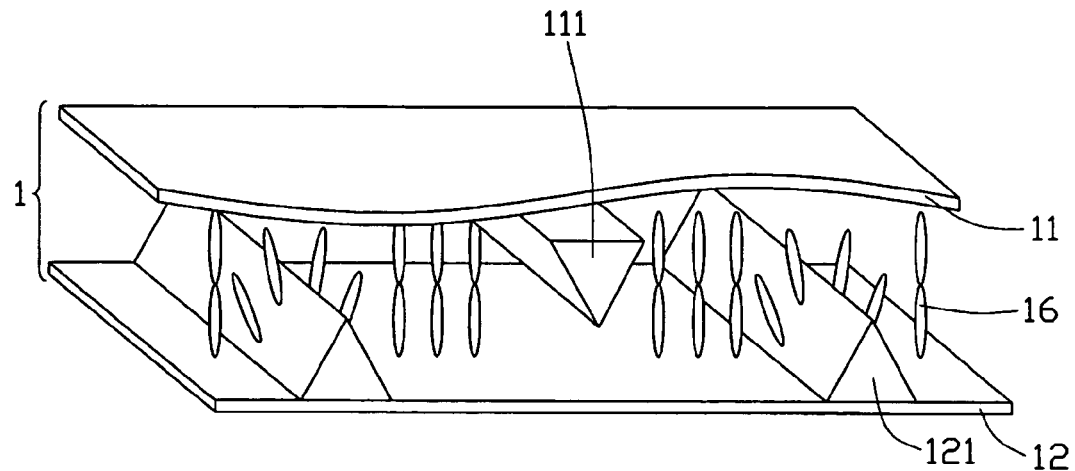
FIG. 6 is a schematic, isometric cutaway view of part of a conventional MVA liquid crystal display (LCD), showing the LCD in an off state.
Figure 7:
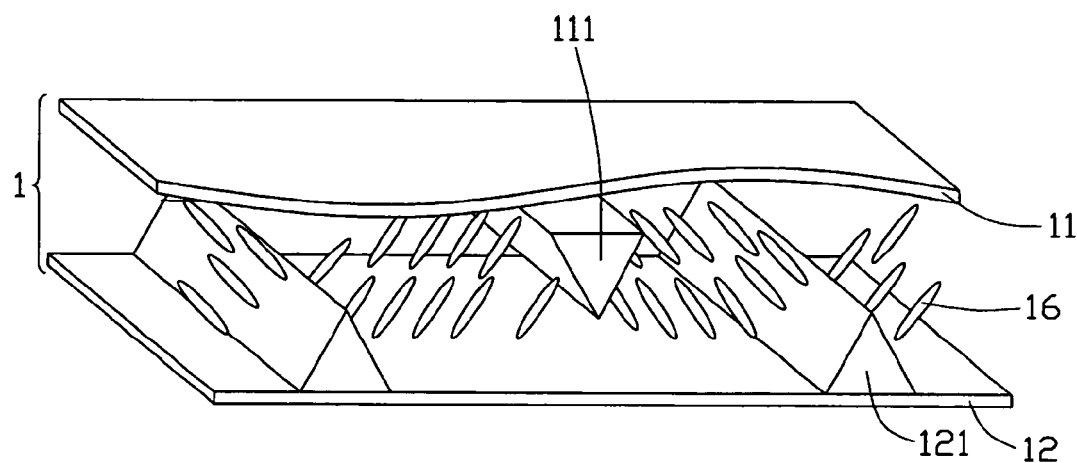
FIG. 7 is similar to FIG. 6, but showing the LCD in an on state.
Figure 8:
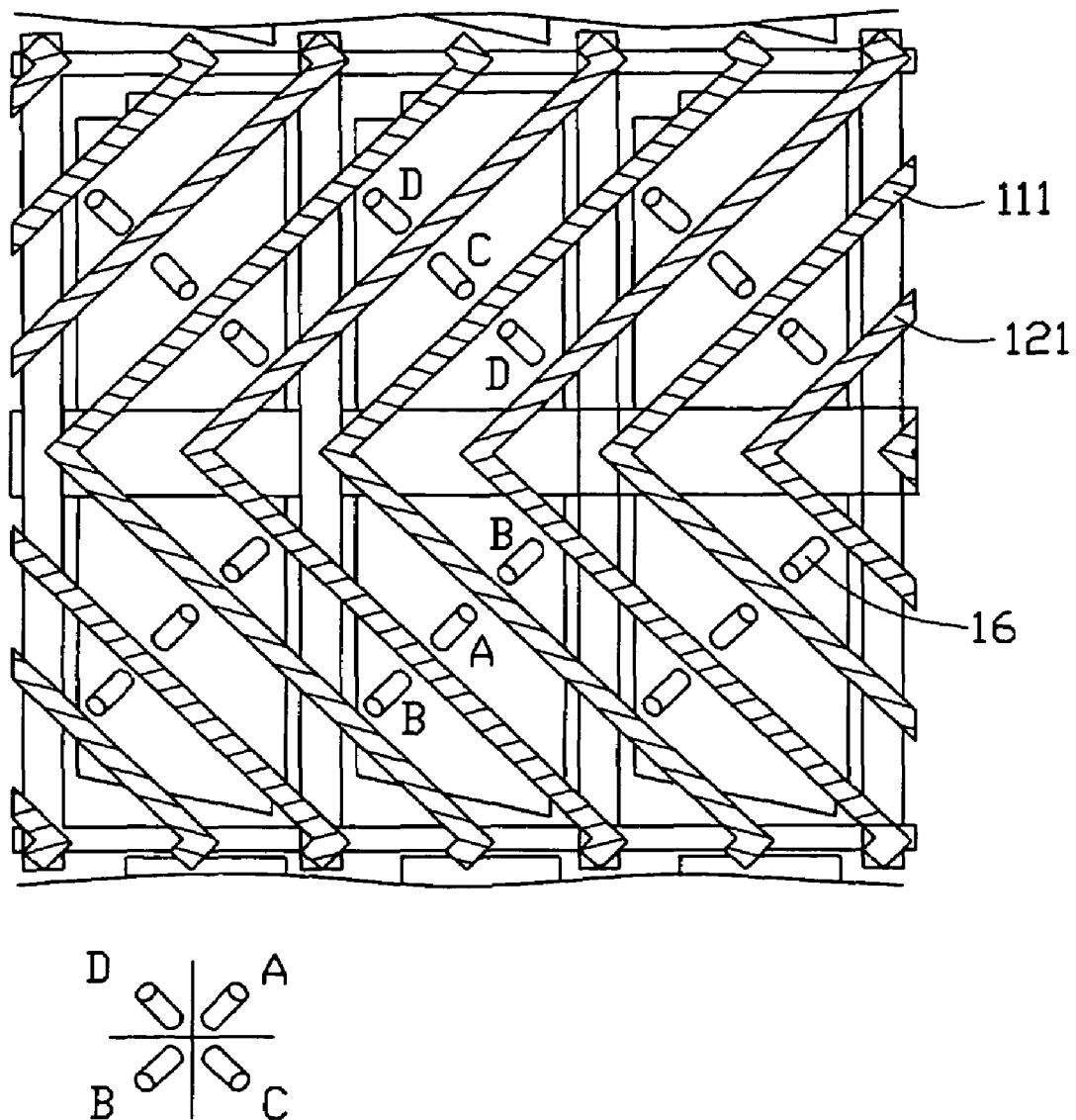
FIG. 8 is a schematic, top elevation of part of the conventional MVA LCD in the on state, but not showing a first substrate thereof, and showing orientations of liquid crystal molecules thereof.

FIG. 5 is a view of part of a continuous domain vertical alignment liquid crystal display (LCD) 4 according to the third embodiment of the present invention, showing the LCD 4 in an on state. In the illustrated embodiment, first and second protrusions 411, 421 are wavy, each first and second protrusion 411, 421 comprising plural "S" shapes. A Cartesian coordinate system can be defined, in similar fashion to that described above in relation to the LCD 2. A path defining the wavy shape of each of the first and second protrusions 411, 421 satisfies the following equation:

$$x = A\sin(\pi^* y/nL), (0 \leq y \leq L, n>2, \text{ and } n \text{ is a natural number}) \quad (3)$$

wherein x and y are Cartesian coordinates of any point along the path. 'A' is the horizontal interval between each adjacent first protrusion 411 and second protrusion 421. 'L' is the length of the protrusion 411 or 421 along the Y axis.

The wavy shapes of the protrusions 411, 421 affect the orientations of liquid crystal molecules 46, such that the liquid crystal molecules 46 are directed to incline in various directions in smooth continuums. The visual effect of the LCD 4 is the sum of multiple smooth continuous domains. Thus the LCD 4 provides a more even display performance at various different viewing angles compared to the conventional MVA liquid crystal display 1, and even compared to the LCDs 2 and 3.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A continuous domain vertical alignment liquid crystal display, comprising:
    a first substrate and a second substrate, and liquid crystal molecules interposed therebetween, and
    a plurality of ridge-shaped first protrusions and a plurality of ridge-shaped second protrusions disposed at insides of the first substrate and the second substrate respectively,
    wherein each of the first protrusions is curved along a length thereof, each of the second protrusions is curved along a length thereof, and the curvature of each of the second protrusions corresponds to the curvature of a nearest one of the first protrusions; and
    a maximum width of each first protrusion is less than 10 microns, and a maximum width of each second protrusion is in the range from 5~7.5 microns;
    wherein a path defining the curvature of each of the first and second protrusions satisfies the following equation:

$x = A \sin(\pi * y / nL)$, ($0 \leq y \leq L$, $n$ is a natural number), wherein x and y are Cartesian coordinates of any point along the path, 'A' is a constant number being the interval between each adjacent first protrusion and second protrusion, and 'L' is the length of the first protrusion or the second protrusion along the Y axis.

2. The continuous domain vertical alignment liquid crystal display of claim 1, wherein each of the first and second protrusions has a triangular transverse cross-section.

3. A continuous domain vertical alignment liquid crystal display, comprising:
    a first substrate and a second substrate, and liquid crystal molecules interposed therebetween, and
    first alignment-controlling means and second alignment-controlling means disposed at insides of the first substrate and the second substrate respectively, a maximum width of each first alignment-controlling means being less than 10 microns, and a maximum width of each second alignment-controlling means being in the range from 5~7.5 microns;
    wherein the first alignment-controlling means and the second alignment-controlling means cooperate to assist the formation of a continuum of multiple domains of orientation of the liquid crystal molecules when the continuous domain vertical alignment liquid crystal display is in an on state;
    the first and second alignment-controlling means are first and second ridge-shaped protrusions, respectively; and
    each of the first protrusions is curved along a length thereof, and each of the second protrusions are is curved along a length thereof, and the curvature of each of the second protrusions corresponds to the curvature of a nearest one of the first protrusions;
    wherein a path defining the shape of each of the first and second protrusions satisfies the following equation:

$x = A \sin(\pi * y / nL)$, ($0 \leq y \leq L$, $n$ is a natural number), wherein x and y are Cartesian coordinates of any point along the path, 'A' is a constant number being the interval between each adjacent first protrusion and second protrusion, and 'L' is the length of the first protrusion or the second protrusion along the Y axis.

4. The continuous domain vertical alignment liquid crystal display of claim 3, wherein each of the first and second protrusions has a triangular transverse cross-section.

* * * * *